Feb. 7, 1967    R. L. MORRIS    3,302,514
PHOTOGRAPHIC REPRODUCING DEVICE
Filed May 11, 1964    3 Sheets-Sheet 1
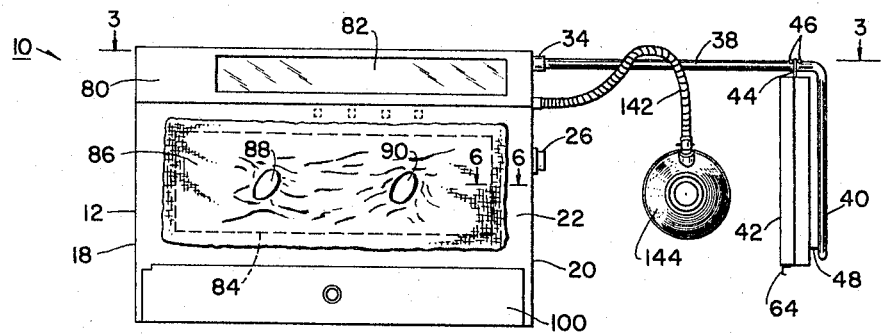
Fig. 1
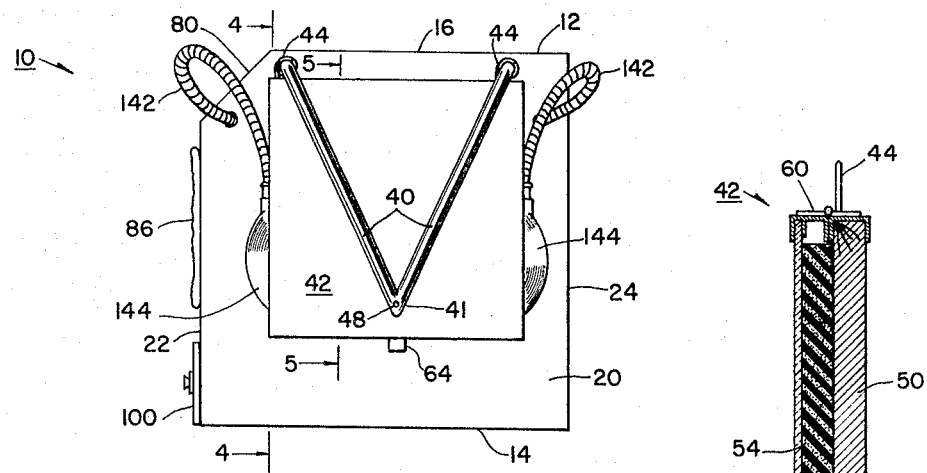
Fig. 2
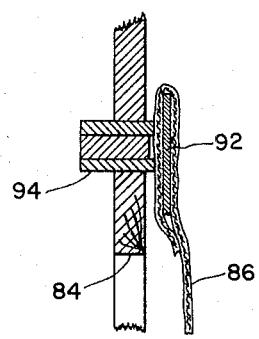
Fig. 6
Fig. 5
INVENTOR.
Robert L. Morris
BY
Richards, Harris & Hubbard
Attorneys INVENTOR.
Robert L. Morris
BY
Richards, Harris & Hubbard
Attorneys

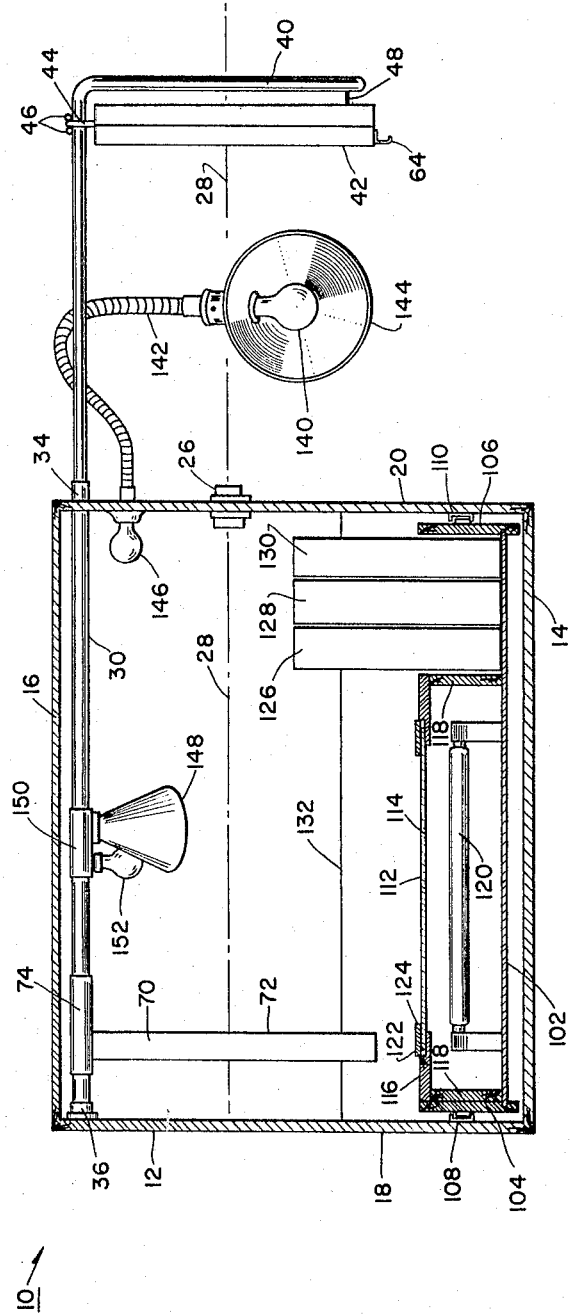

United States Patent Office 3,302,514
Patented Feb. 7, 1967

3,302,514
PHOTOGRAPHIC REPRODUCING DEVICE
Robert L. Morris, 5034 Haywood Parkway,
Dallas, Tex. 75232
Filed May 11, 1964, Ser. No. 366,388
9 Claims. (Cl. 88—24)

The present invention relates generally to the photographic and reproducing arts and more particularly, but not by way of limitation, relates to a compact, portable device for photographic enlargement, reduction and reproduction and in general for performing substantially all steps necessary in the creation of printed advertising layouts and the like.

In the course of creating the offset printing plates for an advertising layout or the like, it is frequently desirable to photographically reproduce a picture or printed page and at the same time either enlarge or reduce the size of the image. Enlarging and reducing cameras have heretofore been devised and used. Substantially all of these cameras have required a full-sized darkroom facility. Some of the camera's devices have been used outside a darkroom, some inside a darkroom, but all require a darkroom in which to develop the exposed film. After a negative of the image has been exposed and developed, it is often necessary to touch the negative up by opaquing certain transparent portions of the otherwise opaque film. This can best be accomplished by positioning the negative on a light table.

Most printed advertising is produced by integrating a number of photographs of different images into a single layout. Then the entire layout is photographed, enlarged or reduced as required, the negative touched up by opaquing and attached to a masking sheet, and offset plates made from the negative by a contact-type printing procedure. Therefore, in order to have a complete system for producing printed advertising or the like, it is necessary to have a darkroom, and facilities for enlarging and reducing, for contact printing, for making offset printing plates, for opaquing, and for layout work in general. Heretofore, complete facilities for this purpose have been expensive. Further, the equipment heretofore used required considerable space in a printing or other business establishment.

The present invention contemplates a single, compact, portable, relatively inexpensive device which can be used as a process camera for photographing an image in either enlarged or reduced size, as a darkroom, as an offset press plate maker, as a contact printer, and which can be used for opaquing, stripping, and layout work in general so as to provide substantially every facility necessary for photographic reproducing and plate making in general and which can be operated in sunlight or in an artificially lighted room. Without here intending to limit the scope of the invention, the device may be generally described as comprising a light-tight box having a lens disposed in one wall and having an optical axis extending generally normal to the wall. A copyholder is adjustably connected to the exterior of the box for movement longitudinally of the optical axis. A film holder is positioned within the box and is also adjustable longitudinally of the optical axis so the enlarged or reduced photographs can be made. A red glass or plastic window is provided in the wall of the box so that an operator may view the interior of the box without exposing unprotected film within the box. Light-tight access means, such as flexible sleeves, are also provided such that the operator can reach into the interior of the box without affecting the light-tight seal. Suitable receptacles for developing fluids are disposed within the box so that exposed film can be developed without removing the film from the box.

In accordance with another aspect of the invention, the copyholder is positionable within the box for contact printing purposes and a suitable exposure light source is positioned within the box to carry out the contact printing. Offset printing plates may also be produced using the same copyholder and a second set of more intensive exposure lights disposed within the box. In accordance with still another aspect of the invention, an opaquing table is positioned in the bottom of the box and is provided with at least one straight edge, and preferably two disposed at right angles, so that all necessary opaquing, stripping and layout work can all be accomplished. In particular, the light table is preferably formed in a drawer so that the light table can be easily extended for use and conveniently stored out-of-the-way. Other more specific aspects of the invention will be pointed out by the appended claims.

Therefore an important object of the present invention is to provide a device of the type described which is simple, compact, portable, and relatively inexpensive.

Another object of the present invention is to provide a combination camera and darkroom for producing completed photographs, either reduced or enlarged, of an image.

Still another object of the present invention is to provide a device of the type described which may be used to produce offset printing plates.

Yet another object of this invention is to provide a complete contact printing device.

A further object of the present invention is to provide a novel combination of a light table and a darkroom.

Many additional objects and advantages of the present invention will be evident to those skilled in the art from the following detailed description and drawings, wherein:

FIGURE 1 is a front elevational view of a device constructed in accordance with the present invention;

FIGURE 2 is a side elevational view of the device of FIGURE 1;

FIGURE 4 is a sectional view taken substantially on lines 4—4 of FIGURE 2;

FIGURE 5 is a sectional view taken substantially on lines 5—5 of FIGURE 2; and

FIGURE 6 is a sectional view taken substantially on lines 6—6 of FIGURE 1.

Figure 3:
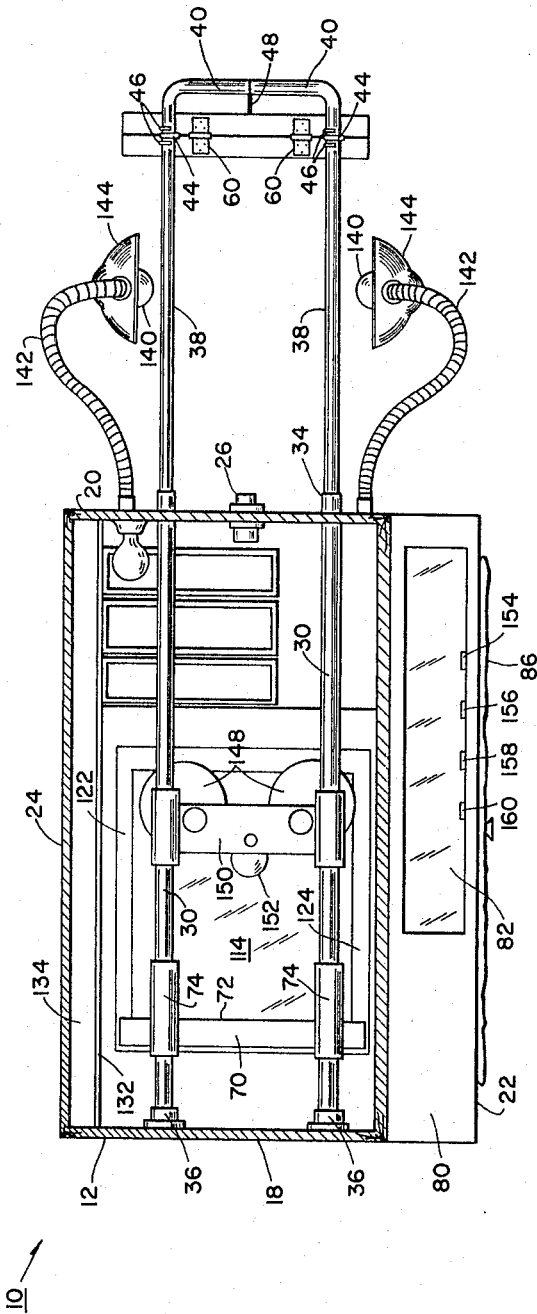
FIGURE 3 is a sectional view taken substantially on lines 3—3 of FIGURE 1.

Referring now to the drawings, a device constructed in accordance with the present invention is indicated generally by the reference numeral 10. The device 10 is comprised of a light-tight enclosure or box, indicated generally by the reference numeral 12, having a bottom 14, a top 16, end walls 18 and 20, front wall 22 and back wall 24. A conventional process photographic lens 26 is positioned in the wall 20 and has an optical axis 28 extending generally longitudinally of the box 12 and generally perpendicular to the end wall 20.

A pair of tubular supports 30 are disposed within the box 12. The supports 30 are disposed parallel to the optical axis 28 and in a plane generally parallel to the bottom wall 14. The right-hand ends 34 (when referring to FIGURE 3) of the tubular support 30 extend through the end wall 20 and the left-hand ends 36 are secured to the wall 18 by any suitable means for support. A second pair of tubular support members 38 are slidably received in the tubular supports 30 and have depending portions 20 which are interconnected at 41 to form a V as best seen in FIGURE 2.

A copyholder, indicated generally by the reference numeral 42, is suspended from the tubular support members 38 by a pair of hooks 44 which are preferably received between stops 46 positioned on the tubular support members 38. A screw 48 is threaded through the lower end of the portions 40 and engages the lower end of the copyholder 42 to adjust the position of the copyholder until the face thereof is precisely perpendicular to the optical axis 28.

The copyholder 42 is preferably constructed substantially as shown in FIGURE 5. The copyholder 42 may conveniently comprise a generally rectangular piece of wood 50 or the like bounded by a metal frame 52. A resilient easel 54, such as plastic or rubber foam, is bonded to the face of the wood 50 by any suitable means. A glass plate 56 is pressed against the surface of the resilient easel 54 by a metal frame 58 which is connected to the top of the metal frame 52 by a hinge 60. A suitable catch means 62 is provided to releasably secure the glass plate 56 in place when the two metal frames are pressed together. A handle 64 provides a convenient means for pivoting the glass plate 56 away from the easel 54 so that the copy sheet may be inserted between the easel 54 and glass plate as hereafter described.

A film holder, indicated generally by the reference numeral 70, is disposed within the box 12 and preferably comprises a glass plate having a flat face 72, that is disposed perpendicular to the optical axis 28 and a suitable frame for holding the glass plate which is connected to a pair of tubular sleeves 74. The sleeves 74 are slidably disposed around the tubular support members 30 so that the film holder 70 can be moved longitudinally of the optical axis 28. Suitable means (not illustrated) may be provided to adjust the position of the film holder until the surface 72 is precisely normal to the optical axis. Then since the tubular support members 30 are disposed parallel to the optical axis, further adjustments as the film holder is moved along the axis will not be required. The face 72 may be provided with any suitable means for securing a film in place thereon, but is preferably coated with a conventinal tacky material against which the film may be pressed and secured in place.

The front wall 22 of the box 12 is provided with a sloping corner portion 80 in which is disposed a red glass window 82 of the type which filters out all light which would expose or otherwise be deleterious to unprotected film, yet which passes light visible to the human eye. This permits an operator to view the interior of the light-tight box but prevents the entry of harmful light into the box. A large rectangular aperture 84 in the front wall 22 of the box is covered by light-tight flexible material 86 which forms a pair of sleeves 88 and 90 through which the hand and forearm of the operator may be inserted to gain access to the interior of the box 12. The sleeve openings may be provided with elastic so as to provide a good fit around the forearms of the operator and thereby insure that all harmful light is excluded from the box. The flexible material 86 may be removably secured to the front wall 22 of the box by any suitable means, but is preferably secured by magnetic means comprised of a rectangular frame 92 conformed to but slightly larger than the aperture 84 and fabricated from a magnetically-attractible metal which is sewn into the periphery of the flexible material 86. A plurality of magnets 94 are then positioned in the front wall 22 around the periphery of the rectangular aperture 84 and are so positioned as to attract and hold the metal frame 92 against the front wall 22.

A drawer 100 extends through the front wall 22 adjacent the bottom wall 14 and extends substantially the entire length of the box 12. As can best be seen in FIGURE 4, the drawer 100 is comprised generally of a bottom panel 102 and side panels 104 and 106 and is slidably disposed within the box by conventional channel and roller assemblies 108 and 110. An opaquing table, indicated generally by the reference numeral 112, is positioned in the drawer 100 and is comprised of a frosted or translucent glass plate 114 which is supported in a recess formed in a rectangular frame 116. The frame 116 is supported in the drawer by any suitable means, such as by the rectangular side frame 118. A suitable light source such as a fluorescent bulb 120 is positioned below the translucent glass plate 114. A rectangular frame overlay 122 provides at least one upstanding straight edge 124 and preferably two adjacent straight edges disposed along the left-hand edge and front edge at right angles against which a triangle or T-square may ride while the operator is doing stripping and layout work. If desired, the straight edges may be positioned along the outer left-hand edge and outer front edge so that a more conventional T-square may be used.

Three elongated, relatively tall receptacles 126, 128 and 130 for containing a photographic developer, fixer and rinse solutions, respectively, are positioned within the box 12. The receptacles may be suspended from the partition 132 by any suitable means (not illustrated) and may hang down into the right-hand end of the drawer, in which case the back of the drawer may be notched (not illustrated) to pass the bottoms of the receptacles. A removable gate (not illustrated) may be provided in the front wall 22 between the aperture through which the drawer 100 passes and the aperture 84 so that the receptacles 126, 128 and 130 may be removed from the box.

A partition 132 may extend longitudinally of the box to form a storage bin 134 adjacent the rear wall for film and the like. Also, the upper edge of the partition 132 is preferably disposed slightly above the surface of the opaquing table 112, substantially as illustrated in FIGURE 3. The copyholder 42 may then be removed from the tubular supports 38, inserted through the large aperture 84, and placed on the opaquing table 112 to provide a copyholder for making offset plates and for contact printing, as will hereafter be described in greater detail.

A pair of lights 140 are positioned to illuminate the face of the copyholder. The lights 140 may conveniently be connected to the end wall 20 by flexible metal arms 142 and may be provided with reflectors 144. The flexible arms 142 provide a means for connecting the light sources 140 to the box 12, yet permit the lights to be adjustably moved with respect to the copyholder 42.

A small red light 146 is positioned within the box 12. The red light is of the conventional type used to light darkrooms to such a degree that the human eye can easily detect objects. Yet the red light will not expose or otherwise deleteriously affect unprotected film. A pair of high intensity floodlights 148 suitable for producing offset printing plates are suspended within the box 12. The floodlights 148 may be suspended by any suitable means such as hooks attached to the tubular supports 30, but preferably are suspended from a simple carriage 150 which is slidably connected to the tubular supports 30 so that the lights can be moved to the right-hand end of the box when not in use. A relatively small white light 152, such as a standard 7.5-watt incandescent bulb, is also provided in the interior of the box 12 for contact printing, and may also be conveniently connected to the carriage 150.

The switches 154, 156, 158 and 160 for controlling the lights 140, 146, 148 and 152, respectively, are preferably positioned within the box 12 and may conveniently be mounted on the inside surface of the front wall 22 between the red window 82 and the large aperture 84.

When using the device 10 to produce photocopies, for example, the copy or image which is to be copied is placed in the copyholder 42 by lifting the glass plate 56, inserting the copy between the glass plate 56 and the resilient easel 54, then closing the glass plate until the catch means 62 engages. The copy is then pressed firmly against the inside surface of the glass plate 56 by the resilient easel 54.

The copyholder 42 and film holder 70 are moved longitudinally of the optical axis 28 until the desired degree of enlargement or reduction of the copy image is obtained. For example, if the copy is to be duplicated in size, the copyholder 42 and film holder 70 are positioned at substantially equal distances on either side of the lens 26. If the copy is to be enlarged, the film holder 70 is positioned at a greater distance from the lens 26 than the copyholder 42. On the other hand, if the copy is to be reduced in size, the copyholder 42 is positioned at a greater distance from the lens 26 than the film holder 70. It will be appreciated that any degree of enlargement or reduction can be obtained due to the infinite adjustability of the copyholder 42 and film holder 70 along the optical axis 28, within, of course, the design limits of the device. Therefore, in some instances it may be desirable to position the copyholder and film holder 70 so that, when the lights 140 are turned on, the copy image will be projected onto the film holder 70. The film holder 70 and copyholder 42 can then be moved until the desired degree of enlargement or reduction is obtained. A door (not illustrated) may be provided in the left-hand end wall 18 to view the image projected on the glass plate of the film holder.

A film is then pressed against the tacky surface of the glass forming the face 72 of the film holder 70. This may be accomplished by the operator who inserts his hands and forearms through the holes 88 and 90 of the flexible access means 86. The film may be stored in a light-tight package in the storage bin 134. The red light 146 may be turned on so that the operator can see to remove the film from the container and place it on the film holder 70. Of course, the red light 146 together with the red window 82 prevents premature exposure of the unprotected film.

After the copyholder and film holder are in the desired positions with the copy and film in place, the lights 140 are turned on for a predetermined period of time to expose the film. Normally no shutter need be associated with the lens 26 because insufficient light will be projected through the lens in the absence of the artificial light sources 140. However, if desired, a suitable cap may be applied to the lens 26 on either the outside or inside of the box 12 to prevent light from entering the box. After the film has been exposed, the operator can develop the film without removing it from the box by immersing the film in the conventional developing fluids contained in the receptacles 126, 128 and 130.

The film negative can then be printed by contact printing technique using the copyholder 42 which is removed from the tubular support members 38 and placing it in the box 12. This can be accomplished by removing the flexible access means 86 from the aperture 84. The magnetic fastening means makes this a quick and simple task. The copyholder 42 may conveniently be placed on the opaquing table to facilitate carrying out a contact printing technique. The flexible access means 86 may then be repositioned over the aperture 84. The contact printing technique entails placing a sheet of printing paper on the resilient easel 54, placing the negative over the printing paper, and pressing the glass 56 down against the resilient easel 54. As previously described, the easel 54 presses the sheets firmly and uniformly against the flat under-surface of the glass plate 56. Then the small light 152 is turned on for a predetermined period of time to expose the printing paper through the negative. The exposed paper can then be removed and developed in the fluids contained in the receptacles 126, 128 and 130 to complete the process without removing the materials from the light-tight box. Substantially the same procedure can be used to produce offset printing plates, except that the more intensive floodlights 148 would be used to expose and burn the plates rather than the smaller light 152. Reverses or film positives may be produced using the same contact printing process except that film is used instead of printing paper.

It will also be appreciated that after the first negative is made by the photocopy technique, particularly if a number of different images have been composited into a single copy as is common when producing advertising material, it is frequently necessary to opaque out certain unwanted lines which are present as transparent portions of the negative. This can best be accomplished on the light table 112 by extending the drawer 100. The opaquing table 112 and the straight edge 124 also provide a layout table for making composite layouts for all types of printed material.

If desired, a false bottom (not illustrated) may be placed in the box 12 just above the drawer 100. In such a case, it is of course necessary to extend the drawer 100 in order to use the opaquing table 112. The receptacles 126, 128 and 130 may then be either rested on the false bottom, or suspended in one or more apertures formed in the false bottom and extended into the drawer 100. Or the length of the drawer 100 could be reduced so as to provide room for the receptacles at the end of the drawer.

From the above detailed description of a preferred embodiment of the invention, it will be appreciated that a novel and highly useful device for carrying out substantially all aspects of photo reproducing has been described. The device may be used as an enlarging or reducing camera to produce photocopies, may be used as a contact printer, may be used to produce offset printing plates, and may be used for opaquing, stripping and layout work. The entire photographic process may be carried out within the light-tight box 12 so that no darkroom is required. The device is relatively small, compact and portable and can easily be supported on most conventional tables. The initial cost of the device is considerably less than the total cost of the many pieces of equipment heretofore required to carry out the various processes, and by reason of its compactness is considerably more convenient to use and therefore is time-saving. If desired, the copyholder and film holder may be of the conventional vacuum type in which case a vacuum pump would be included within the box.

Although a preferred embodiment of the invention has been described in detail, it is to be understood that various changes, substitutions and alterations can be made therein without departing from the spirit and scope of the invention as defined by the appended claims.

What is claimed is:

1. A photographic device comprising:
   (a) a substantially light-tight enclosure means having fixed walls,
   (b) photographic lens means having an optical axis disposed in one fixed wall of the enclosure means for projecting an image through the wall of the enclosure means,
   (c) a pair of rods mounted within said enclosure means extending parallel to said axis adjacent to the top of said enclosure means,
   (d) a pair of tubular sleeves telescopically mounted from said fixed wall of said enclosure means and extending away from said rods in direction parallel thereto,
   (e) a copyholder disposed outside the enclosure means suspended from said sleeves and movable longitudinally of the optical axis for holding a copy such that its image will be projected through the lens means generally along the optical axis into the interior of the enclosure means, and
   (f) a film holder disposed in the enclosure means suspended from said rods and movable longitudinally of said rods for holding a film in position to be exposed by light projected generally along the optical axis from the copyholder, whereby a copy may be reproduced, enlarged or reduced as desired by moving the film holder and copyholder along the optical axis relative to the lens means.

2. The combination according to claim 1 wherein said tubular sleeves are telescopically mounted within said pair of rods.

3. A photographic device as defined in claim 1 further characterized by:
access means in a wall of the enclosure means for permitting access of an operator's hand into the interior of the enclosure means without admitting light deleterious to unprotected film,
filter window means in a wall of the enclosure means for transmitting only light not deleterious to unprotected film, yet visible to the human eye, and
receptacle means disposed within the enclosure means for containing fluids for developing exposed film
whereby the operator can position unprotected film on the film holder, expose the film by light projected through the lens means, and develop the film within the light-tight enclosure means.

4. A photographic device as defined in claim 1 wherein:
the enclosure means is provided with access means for passing the copyholder into the interior of the enclosure means, and further characterized by
a controllable light source disposed within the enclosure means for exposing a photographic medium,
whereby a negative may be placed over a photographic medium and the two held by the copyholder, and the light source energized to expose the medium in the areas where light passes through the negative.

5. A photographic device as defined in claim 1 further characterized by:
drawer means slidably disposed in and passing through one wall of the enclosure means and slidably connected for support to the enclosure means, and
light table means disposed in the drawer whereby the light table means may be positioned outside the enclosure means for used by extending the drawer means, or stored within the enclosure means by closing the drawer.

6. A photographic device as defined in claim 1 wherein:
the enclosure means is comprised of a box having a bottom wall, opposite, vertically-disposed end walls, a top wall, and a corner wall interconnecting the top wall and the front wall at an incline,
the filter window means is disposed in the corner wall, and
the access means is disposed in the front wall.

7. A photographic device as defined in claim 1 further characterized by:
drawer means slidably disposed in and extending through the lower portion of the front wall and connected for support between the end walls,
light table means disposed in the drawer means whereby the light table may be positioned inside the box for storage when the drawer is closed and positioned outside the box for use when the drawer is extended, and
at least one straight edge disposed adjacent the surface of the light table.

8. A photographic device as defined in claim 1, wherein the access means is comprised of
a relatively large aperture in one wall of the enclosure means,
resilient light-proof material forming a pair of arm sleeves for covering the aperture having a substantially rigid, magnetically-attractable frame conforming generally to the aperture, and
a plurality of magnet means disposed around the periphery of the aperture and connected to the front wall for holding the frame and resilient material over the aperture.

9. A photographic device comprising:
an enclosure means comprised of a box having a bottom wall, opposite vertically disposed end walls, a top wall, and a corner wall interconnecting the top wal and the front wall at an incline,
flexible access means in said front wall for permitting access of an operator's hand into the interior of the enclosure means without admitting light deleterious to unprotected film into the enclosure means,
filter window means disposed in the corner wall of said enclosure for transmitting only light not deleterious to unprotected film yet visible to the human eye,
a photographic lens having an optical axis disposed in one wall of the enclosure means for projecting an image through the wall along the optical axis,
a copyholder for supporting a copy to be reproduced,
first support means interconnecting the enclosure means and the copyholder for adjustably positioning the copyholder outside the enclosure means at substantially a right angle to the optical axis for movement longitudinally of the optical axis,
a film holder for supporting a film plate,
second support means interconnecting the enclosure means and the film holder for adjustably positioning the film holder inside the enclosure means at substantially a right angle to the optical axis and for movement longitudinally of the optical axis,
receptacle means disposed within the enclosure means for containing fluids for developing exposed films,
drawer means slidably disposed in and extending through the lower portion of the front wall of said enclosure means and connected for support between the end walls thereof, and
light table means disposed in the drawer means, whereby the light table may be positioned inside the box for storage when the drawer is closed and positioned outside the box for use when the drawer is extended, and at least one straight edge disposed adjacent to the surface of the light table.

References Cited by the Examiner
UNITED STATES PATENTS 3,040,640  6/1962  Abel et al. _____ 95—11

NORTON ANSHER, *Primary Examiner.*

R. A. WINTERCORN, *Assistant Examiner.*